3 Sheets--Sheet 1.

E. HOWARD & W. H. JACKSON.

Sewing-Machines for Working Button-Holes.

No. 5,306. Reissued March 4, 1873.

Geo. H. McGrew.
J. E. Kenyt

Edmund Howard
William H. Jackson
by J. E. Maynadier
their atty.

E. HOWARD & W. H. JACKSON.

Sewing-Machines for Working Button-Holes.

No. 5,306. Reissued March 4, 1873.

Geo. H. McGrew.
J. E. Knox.

Edmund Howard
William H. Jackson
by J. E. Maynadier
their atty.

3 Sheets--Sheet 3.
E. HOWARD & W. H. JACKSON.
Sewing-Machines for Working Button-Holes.
No. 5,306. Reissued March 4, 1873.
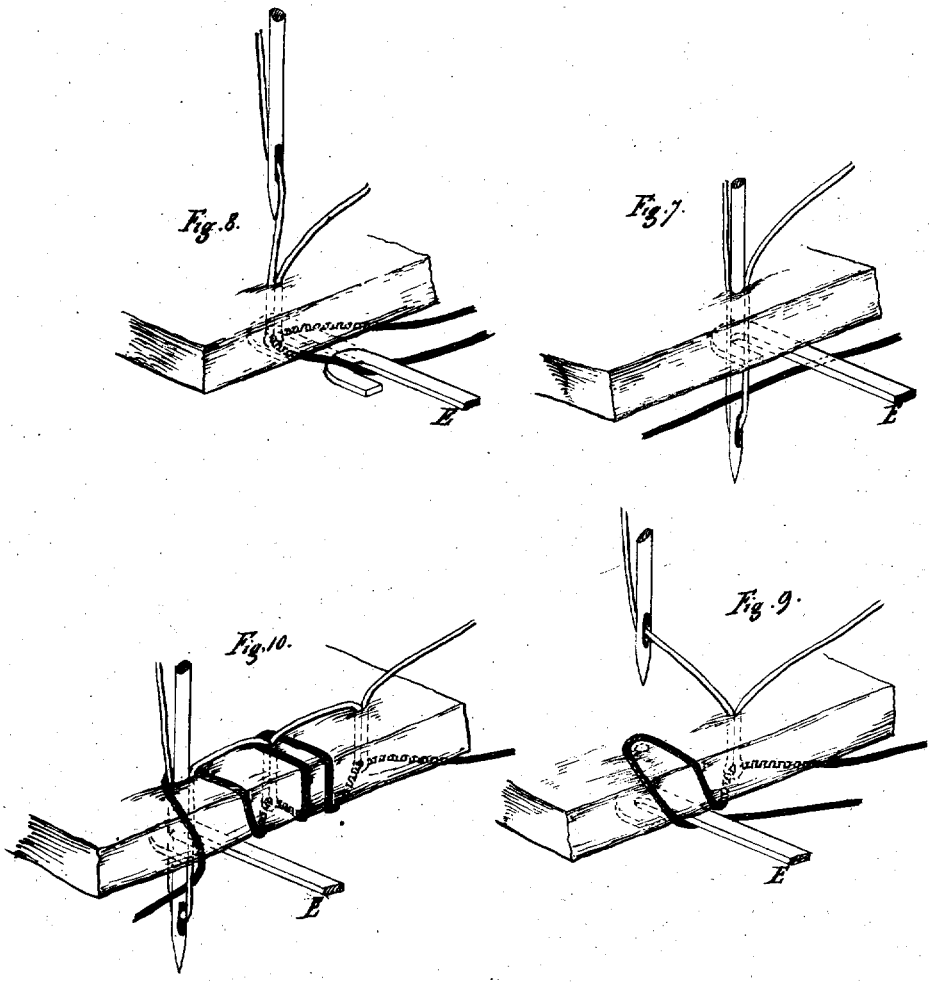
Geo. H. McGrew.
J. E. Knapp.
Edmund Howard
William H. Jackson
by J. E. Maynadier
their atty

UNITED STATES PATENT OFFICE.

EDMUND HOWARD, OF FLUSHING, AND WILLIAM H. JACKSON, OF BROOKLYN, NEW YORK, ASSIGNORS, BY MENSE ASSIGNMENTS, TO HENRY E. TOWNSEND, CHARLES P. BRIGHAM, AND GEORGE W. SIMMONS, OF BOSTON, MASSACHUSETTS.

IMPROVEMENT IN SEWING-MACHINES FOR WORKING BUTTON-HOLES.

Specification forming part of Letters Patent No. 69,671, dated October 8, 1867; reissue No. 5,306, dated March 4, 1873.

*To all whom it may concern:*

Be it known that we, EDMUND HOWARD, of Flushing, Queens county, and WILLIAM H. JACKSON, of Brooklyn, Kings county and State of New York, have invented certain Improvements in Sewing-Machines, of which the following is a specification:

Our invention relates to devices for producing a button-hole stitch, so called, along and over the edge of the material sewed, and is an improvement upon that class of machines in which a loop of thread from under the fabric is carried over the edge of the fabric, and so arranged above the fabric that the needle shall pass through it.

In all such machines known to us the device which catches the thread is not certain in its operation; and the main object of our invention is to produce a device which cannot fail to catch the thread, the distinguishing characteristic of our invention being that the thread is drawn into the device positively as the needle rises.

Figure 1:
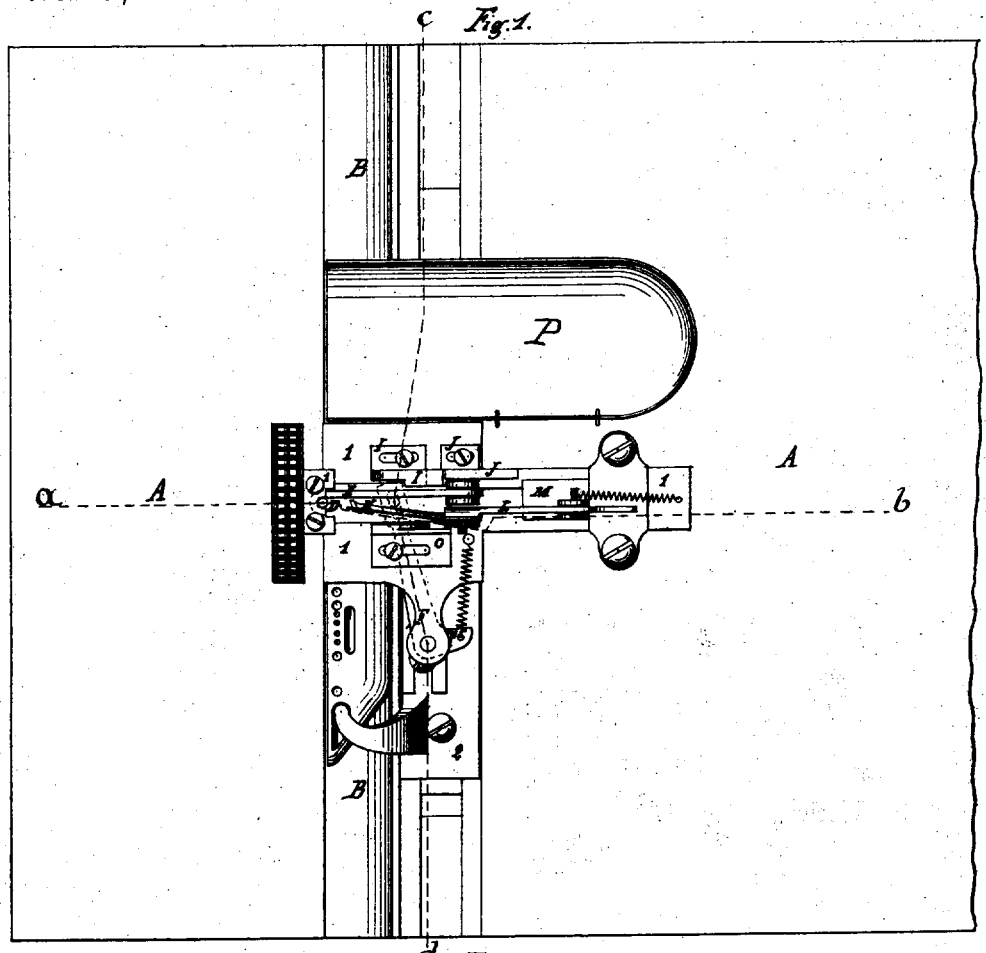
Figure 2:
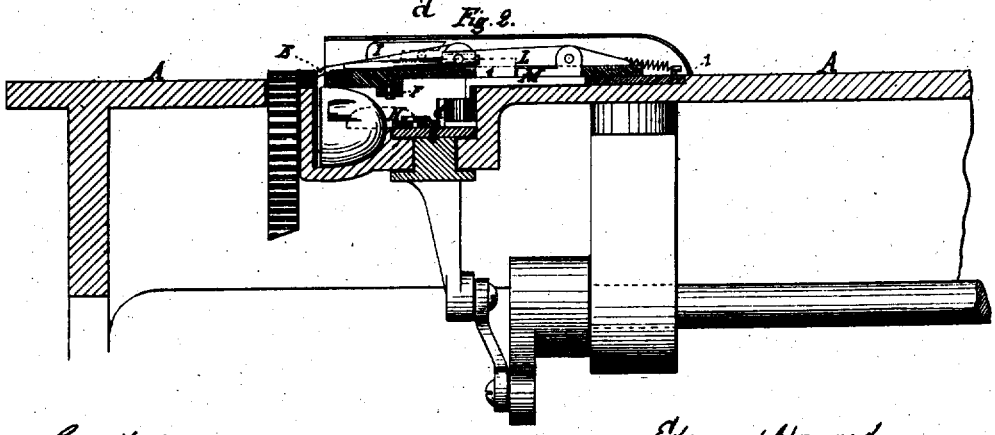
Figure 4:
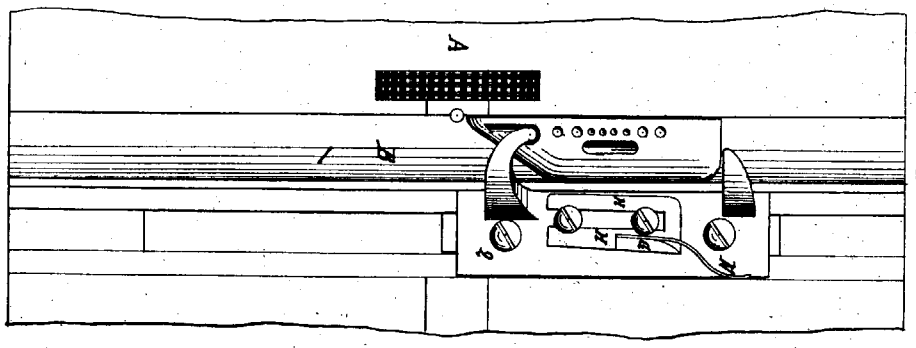
Figure 3:
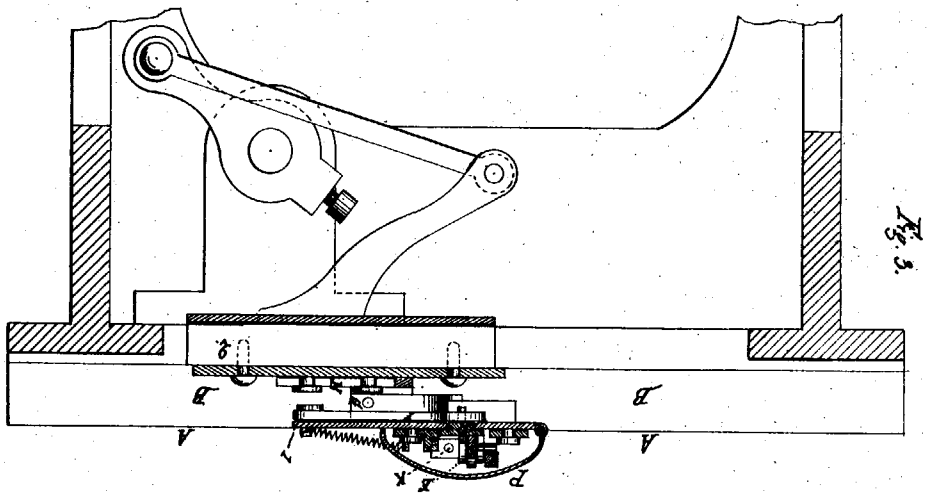
Figure 6:
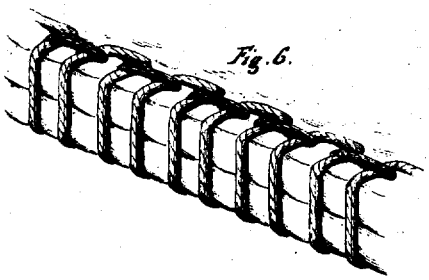

In the accompanying drawing, Figure 1 is a plan; Fig. 2, a section across the path of the shuttle; Fig. 3, a section parallel with that path. The other figures show details of the mechanism for actuating the main parts, and illustrate the principle of our invention.

In the drawing, the devices for catching and carrying the thread are shown attached to the plate 1, and the devices for actuating these first-named devices are shown attached to the shuttle-carriage 2. The entire sewing-machine is not shown, as it is well known.

In the drawing, A is the bed of a sewing-machine; B, the shuttle-race. The plate 1, carrying the devices for catching and carrying the thread, is inserted and secured in the bed A. In the machine shown it occupies the place of the ordinary throat-plate of the machine, and is secured by set-screws, in order that it may be readily removed and replaced, so that the machine may be used for plain sewing or for forming a button-hole stitch, as desired. The device for catching the thread under the fabric to be stitched is mounted upon a slide, D, which is inserted in a slot in the plate 1, so that it can be moved from and toward the throat, through which the needle descends after passing through the fabric. This device is the hooked arm E mounted upon ears projecting from and fast to the slide D. The motions of this arm are so timed that it will move back from and return again to the position shown in Fig. 1 while the needle is above the throat, and be at rest while the needle is in the throat, for the hook upon the arm is so placed that the lower end of the needle will pass directly through it as it descends.

Figure 5:
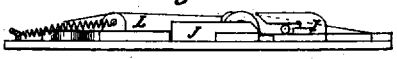

The operation of this device, and the absolute certainty with which it performs its office, will be plain from a close examination of the position of the thread in the machine shown in the drawing, in which two threads are used. A loop of the needle-thread is carried down through the hook by the needle. The shuttle-thread is then carried through this loop in the usual way; consequently, when the needle rises and the needle-thread is drawn upward to form the stitch, the shuttle-thread must be drawn directly into the hook, unless one of the threads breaks. While the needle is rising the under thread is drawn by this hook into position to be caught by the device, which lays the loop of the under thread on the upper side of the fabric, so that the needle, at its next descent, will pass through it. The under thread remains constantly in the hook; but should it, by accident, escape from it, (which it can only do in the return of the hook,) it is again drawn into the hook, as before described. As an additional precaution, the slide D has a throat formed in it, through which the under thread is drawn precisely as it is drawn into the hook, and from which it cannot escape, except by the breaking of the thread. The throat in the plate 1 must of course be open toward the slot in the plate 1. This open throat in the plate 1, the hook and the throat in the slide D, form the real throat of the machine, the needle playing through them, and the under thread extending through them from the fabric to the shuttle precisely as the needle plays through and the under thread extends through the throat of an ordinary shuttle machine. The slide D receives its motions from the elbow-lever F, which is actuated in one direction by the projection G on the plate H, fixed to the shuttle-carriage 2, and in the other direction by a spring attached to the short arm of the crank-lever. As this slide and the hooked arm are moved away from the throat, carrying the under thread with them, a pin on the arm playing between guides I and J (more fully shown in Fig. 5) causes the arm to rise sufficiently to bring the thread into the device, which lays it in a loop on the upper side of the fabric so that the needle shall pass through it. This latter device is a needle, K, secured in a sleeve in the arm L. The needle K is slit or grooved from its outer end longitudinally, the groove facing outward. Its arm L is hung in ears upon a second slide, M, which is also inserted in the slot in the plate 1, before mentioned, that slot being long enough to allow the necessary play to both the slides. This slide M, and the arm and needle carried by it, is actuated in one direction by the cam-spring N on the projection on the plate H, and in the other direction by the spiral spring attached to it. The arm L is properly guided in its motion toward the needle by a suitably-formed guide, O. In order to obtain the requisite nicety of adjustment the guides I, J, and O are secured by slots and set-screws to the plate 1.

The diagrams on Sheet 3 of the drawing are intended to make more clear the manner in which the thread under the fabric is drawn into its carrier.

In the sewing of button-holes, in order to hold the button-hole open, a raised cover, P, is hung to the attachment in such manner that when closed over it it will form a rest for the opposite edge of the button-hole to that on which the needle is operating, above the plane of such edge, and thereby hold the same open or away therefrom sufficiently to prevent any interference with the needle movement.

We are aware that devices for catching the under thread in order to form a button-hole stitch are old, and do not claim any such device, broadly; but the principle of our device differs from that of any other known to us, in that it forms a part of the throat of the machine; and consequently the under thread must be positively drawn into it as the needle rises, thereby preventing all possibility of a mis-stitch from the failure of the device to catch the under thread. No other device for catching the under thread, known to us, has ever formed a part of the throat of the machine; nor do we know of any which catches the thread with absolute certainty.

We claim as our invention—

1. The arrangement of the device for catching the under thread in a button-hole sewing-machine, substantially as above described, so that it will form a portion of the throat of the machine, as and for the purpose specified.

2. The combination of the hooked arm E and slit needle K, or their respective equivalents, when arranged to operate together and with reference to the ordinary sewing mechanism, substantially as described, and for the purpose specified.

3. The combination of the hooked arm, slit needle, under thread-carrier, and connecting mechanism, substantially as described.

EDMUND HOWARD.
W. H. JACKSON.

Witnesses:
JAMES R. HENRY,
H. W. MABIE.